United States Patent [19]

Sasaki et al.

[11] Patent Number: 5,539,858
[45] Date of Patent: Jul. 23, 1996

[54] VOICE CODING COMMUNICATION SYSTEM AND APPARATUS

[75] Inventors: Seishi Sasaki; Masayasu Miyake, both of Sendai, Japan

[73] Assignee: Kokusai Electric Co. Ltd., Tokyo, Japan

[21] Appl. No.: 261,878

[22] Filed: Jun. 17, 1994

Related U.S. Application Data

[63] Continuation of Ser. No. 889,505, May 27, 1992, abandoned.

[30] Foreign Application Priority Data

May 31, 1991 [JP] Japan ................. 3-155972
Feb. 19, 1992 [JP] Japan ................. 4-069747

[51] Int. Cl.⁶ ........................................... G10L 5/00
[52] U.S. Cl. .................. 395/2.21; 395/2; 395/2.35; 395/2.24; 381/46
[58] Field of Search .............. 384/46; 395/2.17, 395/2.19, 2.21, 2.23, 2.24, 2.35, 2.42

[56] References Cited

U.S. PATENT DOCUMENTS

| | | | |
|---|---|---|---|
| 3,832,491 | 8/1974 | Sciulli et al. | 381/46 |
| 4,008,375 | 2/1977 | Lanier | 381/46 |
| 4,061,878 | 12/1977 | Adoul et al. | 381/46 |
| 4,449,190 | 5/1984 | Flanagan et al. | 395/2.24 |
| 4,860,313 | 8/1989 | Shpiro | 395/2.21 |
| 4,989,246 | 1/1991 | Wan et al. | 395/2.21 |
| 5,005,183 | 4/1991 | Corey et al. | 375/1 |
| 5,054,073 | 10/1991 | Yazu | 395/2.24 |
| 5,121,349 | 6/1992 | Waito | 364/717 |

*Primary Examiner*—Allen R. MacDonald
*Assistant Examiner*—Thomas J. Onka
*Attorney, Agent, or Firm*—Emmanuel J. Lobato

[57] ABSTRACT

A voice coding communication system in case of applying an adaptive differential PCM system in which a discontinuous transmitter is provided at the transmitting side to reduce its power consumption, transmission is suspended during a silent duration, and a pseudo-noise is generated at the receiving side and is used as the reproduced output during the silent duration. Discomfort is avoided in hearing the reproduced voice which is caused by the difference between the level of the pseudo-noise and the level of a background noise at the transmitting side.

2 Claims, 4 Drawing Sheets

VOICE CODING COMMUNICATION SYSTEM AND APPARATUS

This is a continuation, of application Ser. No. 07/889,505, filed May 27, 1992 now abandoned.

BACKGROUND OF THE INVENTION

The present invention relates to a voice coding communication system and apparatus therefor and, more particularly, to a voice coding communication system and apparatus therefor which apply an adaptive differential pulse code modulation (hereinafter referred to simply as ADPCM) system to their coding system.

It is said that the voice activity factor of either the calling or called party in voice communication is 35% or so.

In recent years, personal communication, mainly from person to person, has become widespread. The personal communication is usually voice communication which utilizes portable terminal equipments. A first requirement for such portable terminal equipments is to make them cordless and a second requirement is to reduce power consumption of their circuits so as to lengthen the service life of batteries which are employed with a view to making the terminal equipments easy to carry.

One possible method that has been proposed to reduce the power consumption more than in the past is to actuate the transmitter only during voice activity and hold it out of operation during the other transmission time, taking the voice activity factor into account. This method could be implemented by equipping the transmitting side with a voice activity detecting function and a discontinuous transmitter. This method, however, poses a problem at the receiving side. That is, the reproduced voice at the receiving side is discontinuous and hence is very uncomfortable. As regards the cause of this problem, it is well-known that during transmission of voices they are superimposed on background noise, whereas when no voice is being transmitted the background noise is not transmitted either and that only during the duration of a voice signal the background noise is modulated and transmitted together with the voice signal.

As a solution to this problem, it is well-known to generate a pseudo-noise similar to the background noise at the transmitting side while no voice signal is transmitted to the receiving side. Such a technique was studied first in the field of digital communication employing a low bit rate coding method based on a speech analysis-synthesis technique which analyzes and transmits a voice signal and synthesizes the voice signal at the receiving side, and this technique has now become well-known in some limited technical fields, with a standardization algorithm established.

The speech analysis-synthesis typed low bit rate coding method is one that transmits the input voice signal as a short-time (about 20 msec) spectrum envelope parameter and parameters such as a distinction between voiced and unvoiced sounds and a pitch period. This method is effective in the generation of a pseudo-noise similar to a relatively gently changing background noise and will be implemented in digital automobile telephone.

On the other hand, an object of application of the present invention is a voice coding communication system of the ADPCM system which is one of speech waveform coding techniques now used as standard methods for personal communication, and a method which generates, at the receiving side, a pseudo-noise similar to the background noise at the transmitting side as mentioned above has not as yet been applied to the voice coding communication system.

The ADPCM coding system is now used in a wire transmission line (or public telecommunication network) as a substitute for the conventional PCM system. The reason for this is that the PCM system has a transmission rate of 64-kbit/s, whereas the ADPCM system has a transmission rate of 32 kbit/s but provides the same speech quality as is obtainable with the PCM system and hence permits a two-fold increase in the utilization efficiency of the circuit used.

The reason for the use of the ADPCM system in personal communication is that present-day personal communication is ranked as an extension of the public telecommunication network, such as the existing cordless telephone for domestic use, and is regarded as part of the public telecommunication network unlike the digital automobile telephone. Therefore, the techniques of detecting the voice activity during coding and generating the pseudo-background noise at the receiving side during decoding as mentioned above have not been studied with respect to the ADPCM system. This is because it has been applied to the wire transmission and hence have not been restricted by its power supply.

SUMMARY OF THE INVENTION

It is therefore an object of the present invention to provide a voice coding communication system and apparatus therefor which alleviates uncomfortableness of the reproduced voice by inserting an effective background noise into the reproduced voice signal in the ADPCM voice coding system.

The voice coding communication system according to the present invention, which stops transmission during the silent duration so as to save the transmitting power of the voice coding unit and a pseudo-noise generated at the receiving side is used to reproduce an output during the silent duration, characterized in that the transmitting side has an arrangement in which a voice signal is transmitted in the form of an adaptive differential PCM code and when the above-mentioned silent duration begins, comfort noise flags indicating the silent duration and encoded background noise following the flags are transmitted at predetermined intervals for a predetermined period of time, and in that the receiving side has an arrangement in which the received signal encoded in the adaptive differential PCM code is decoded to reproduce the voice signal and when the comfort noise flag is detected from the received signal, the predictive coefficients and the level of the encoded background noise following the flag are held and then the background noise is switched to a pseudo-noise generated at the receiving side and is decoded using the above-mentioned predictive coefficients and its level is corrected to be equal to that of the background noise using the held level, thus providing the reproduced signal.

The voice coding apparatus according to the present invention for carrying out the above-said communication system, which is equipped with a discontinuous transmitter which stops transmission during the silent duration so as to reduce the transmitting power in the case of transmitting the input voice signal in an encoded form, characterized by: an adaptive differential PCM encoder for encoding the input voice signal into an adaptive differential PCM code; a voice activity detector for detecting the presence or absence of the voice of the input voice signal; a comfort noise flag generator for generating the comfort noise flags indicating the silent duration; a switch for selectively providing therethrough the output of the adaptive differential PCM encoder and the output of the comfort noise flag generator; a discontinuous transmitter which provides the output from the switch on the transmission line and stops transmission from the end of a predetermined period of time elapsed after the transmission of the comfort noise flag to the start of the next comfort noise flag or of the voice activity period; and a controller which upon detecting the starting point of the silent duration by the output signal from the voice activity detector, controls the switch to output therethrough the comfort noise flag and the encoded background noise from the adaptive differential PCM encoder at predetermined invertals over the afore-mentioned predetermined period of time in the silent duration.

The decoding apparatus according to the present invention is characterized by: an adaptive differential PCM decoder which receives, as the input thereto, the adaptive differential PCM coded voice signal and the comfort noise flag indicating the silent duration of the voice signal and the adaptive differential PCM coded background noise and which decodes the received adaptive differential PCM coded voice signal, holds predictive coefficients obtained when the coded background noise was decoded and then decodes the subsequent pseudo-noise through use of the held predictive coefficients; a pseudo-noise generator for generating the pseudo-noise; a first switch for selectively inputting there through the received input and the pseudo-noise into the adaptive differential PCM decoder; a comfort noise gain adjuster which receives the decoded signal from the adaptive differential PCM decoder and, when the decoded signal is the background noise, holds the level of the background noise and corrects the decoded signal level of the pseudo-noise to be equal to that of the background noise held; a second switch for selectively outputting therethrough the outputs of the adaptive differential PCM decoder and the comfort noise adjustor as the reproduced signal output; and a controller which, when the comfort noise flag is detected from the received input and the background noise subsequent to the comfort noise flag comes to an end, connects the first switch to the pseudo-noise generator side and the second switch to the comfort noise gain adjustor side and, when the comfort noise flag is detected next, connects the first switch to the received input side and the second switch to the adaptive differential PCM decoder side.

BRIEF DESCRIPTION OF THE DRAWINGS

The present invention will be described in detail below with reference to the accompanying drawings, in which.

DETAILED DESCRIPTION

Figure 1:
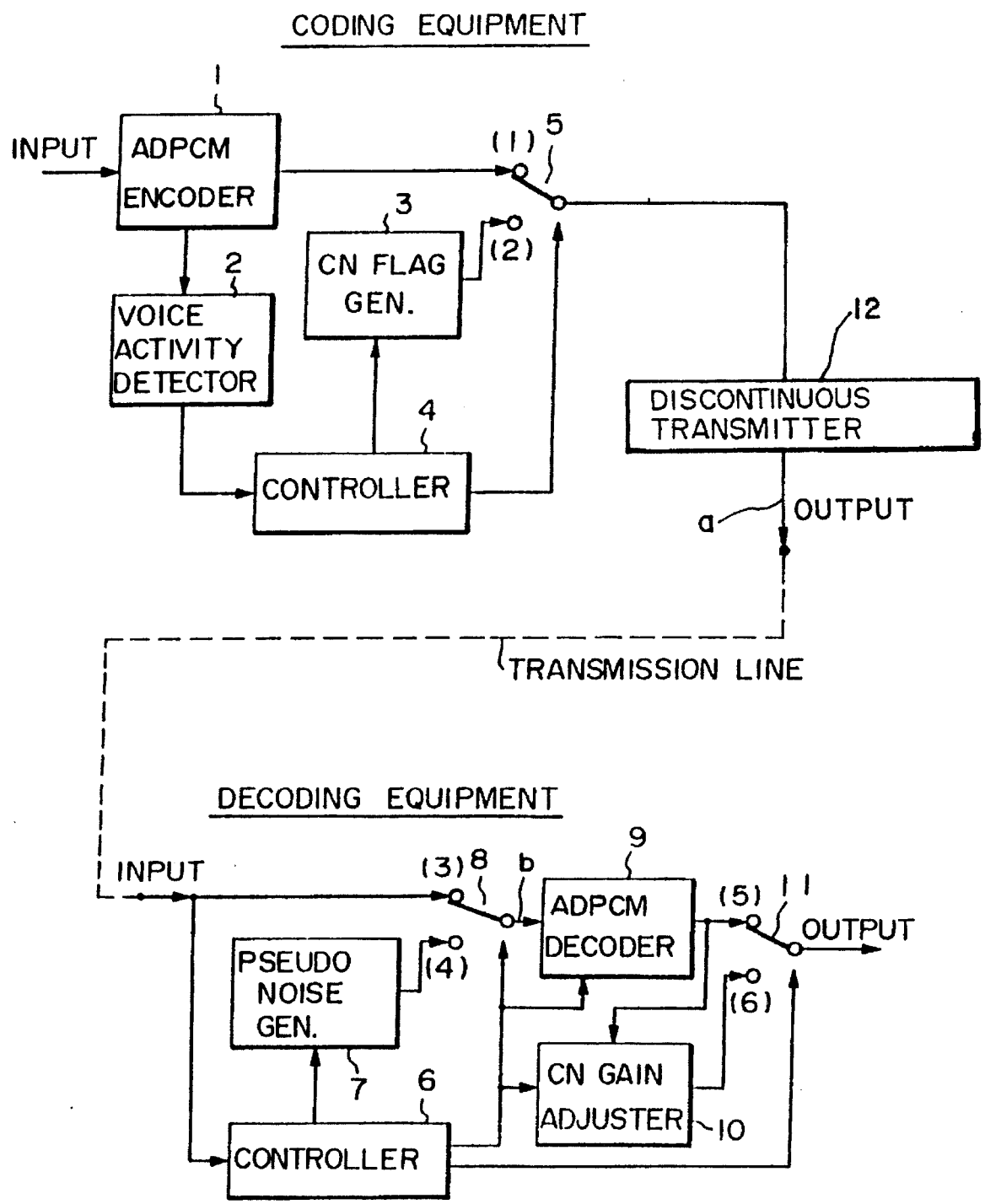
FIG. 1 is a block diagram illustrating an embodiment of the present invention.

With reference to FIG. 1 illustrating in block form an embodiment of the present invention, reference numeral 1 indicates an ADPCM encoder, which uses-the conventional ADPCM system defined by the CCITT G. 721 standard and has no specific additional function.

Reference numeral 2 denotes a voice activity detector for detecting the presence or absence of a voice.

Reference numeral 3 denotes a CN (Comfort Noise) flag generator, which generates a CN flag indicating the absence of a voice and the subsequent transmission of CN data (background noise). The CN flag is a data pattern which is easily distinguishable from ADPCM encoded data of a voice. Assuming that the sending time is 1 msec, the CN flag is 32-bit and it is possible to generate a pattern which is fully distinguishable from the voice data. The CN data which is sent next to the CN flag is composed of a spectral envelope and level information of the background noise and is transmitted at predetermined intervals for a predetermined period of time in the silent duration. For example, the CN flag sending time is 1 msec in FIG. 1 and the CN data sending time is 20 msec. Reference numeral 4 denotes a controller, which determines the time lengths and sending intervals of the CN flag and the CN data and controls the CN flag generator 3 and a switch 5. The controller 4 can be implemented by using a counter as its principal element. Reference numeral 5 identifies a digital signal switch.

Reference numeral 12 denotes a discontinuous transmitter, which, when the silent duration begins, stops the transmission output after transmission of the CN data subsequent to the CN flag, thereby reducing the power consumption of the transmitter.

In the decoding apparatus, reference numeral 6 indicates a controller for detecting a specific data pattern of the CN flag. The controller 6 can easily be formed by a correlation detector or the like.

Reference numerals 7 denotes a pseudo-noise generator, which is a random number generator which, in the case of 32 kbit/s, generates 15 random numbers ranging from +7 to −7 because the number of bits per sample is four in this instance. The pseudo-noise generator 7 can easily be formed by a circuit using a shift register as its principal element.

Reference numerals 8 and 11 denote switches, which are controlled by the controller 6.

Reference numerals 9 denotes an ADPCM decoder, which is basically identical with the circuit defined by the CCITT G. 721 standard and has one of features of the invention in a method of updating predictive coefficients (spectral envelope information) which are used for decoding. In the conventional ADPCM decoder the predictive coefficients are computed from decoded voice data. In such a case, there is no problem when the input data to the ADPCM decoder is a decoded version of a signal which is transmitted from the transmitting side, such as voice data or CN data. In the present invention, however, no signal is received in the silent duration after the CN data as mentioned above and the input to the ADPCM decoder 9 is the output of the pseudo-noise generator 7, and therefore, the spectral envelope of the actual background noise cannot be reproduced. To avoid this, the ADPCM decoder 9 is equipped with a function whereby the predictive coefficients are held when the CN data is received and decoded and the output of the pseudo-noise generator 7 in the subsequent silent duration is decoded using the predictive coefficients to provide a spectral envelope characteristic.

Figure 3:
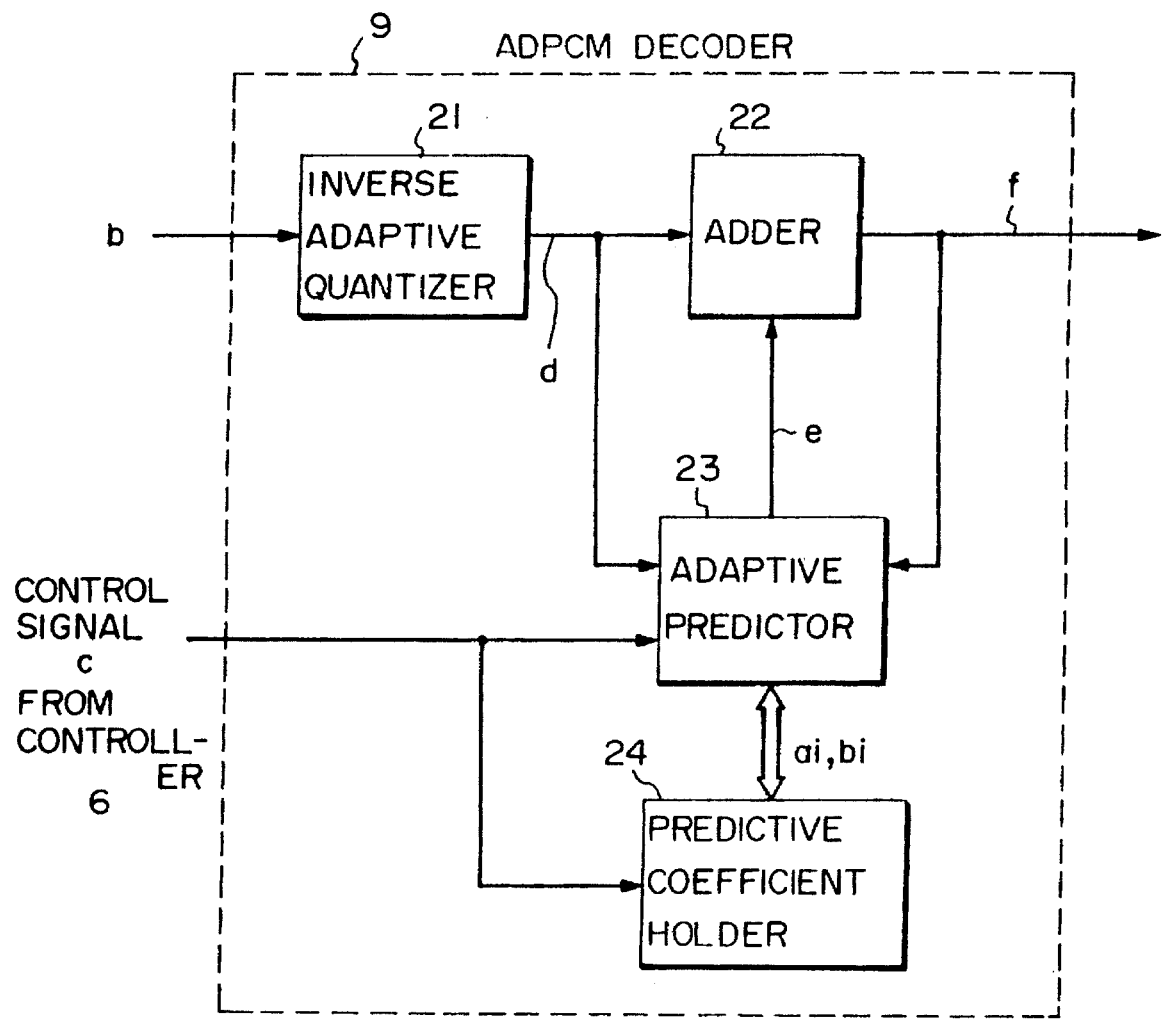
FIG. 3 is a block diagram illustrating a part of the present invention.

FIG. 3 illustrates in block form an example of the internal circuit construction of the ADPCM decoder 9 according to the present invention. Reference numeral 24 indicates a predictive coefficient holder additionally provided according to the present invention.

A description will be given of the ADPCM decoder 9 shown in FIG. 3.

An input signal b (see FIG. 1) is inversely quantized by an inverse adaptive quantizer 21 into a quantized differential signal d. An adder 22 adds the quantized differential signal d and a predictive signal e from an adaptive predictor 23 to generate a reproduced signal f. The reproduced signal f is used as the output of the ADPCM decoder 9.

The adaptive predictor 23 generates the predictive signal e by the following equation, using predictive coefficients $a_i$ (i=1, 2) and $b_i$ (i=1 to 6).

$$Se(k) = \sum_{i=1}^{2} a_i(k-1)Sr(k-i) + Se_2(k)$$

$$Se_2(k) = \sum_{i=1}^{6} b_i(k-1)dg(k-i)$$

Where Se(k) is the predictive signal e, Sr(k-i) is the reproduced signal f, dg(k) is the quantized differential signal d and a notation k is a sample point.

The predictive coefficients $a_i$ (i=1, 2) and $b_i$ (i=1 to 6) have spectral envelope information of the input signal. In the conventional ADPCM decoder these predictive coefficients are adaptively updated by the input signal at all times. The ADPCM decoder according to the present invention has its feature in that the updation is stopped by a control signal c from the controller 6 (FIG. 1) and the predictive coefficients can be fixed for a desired period of time.

A predictive coefficient holder 24 is a circuit which latches the predictive coefficients $a_i$ and $b_i$ for the desired period of time. When receiving a fixing instruction from the control signal c, the adaptive predictor 23 does not update the predictive coefficients but instead receives the predictive coefficients latched in the predictive coefficient holder 24 and generates the predictive signal e. In this case, there are set in the predictive coefficient holder 24 predictive coefficients at a sample point immediately before their fixing. A description will be given of the timing for switching between the updation and fixing of the predictive coefficients by the control signal c.

Figure 4:
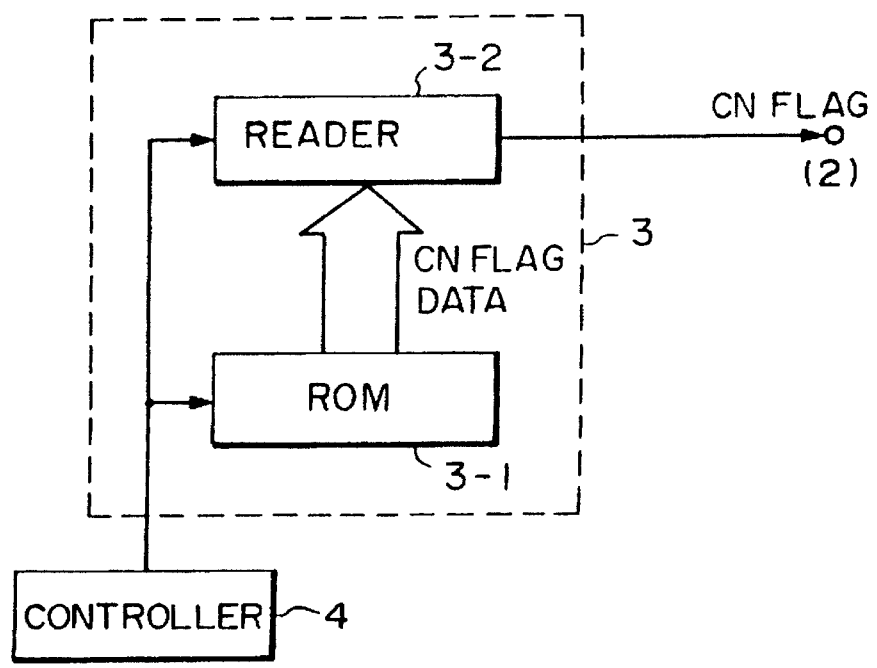
FIG. 4 is a block diagram illustrating an example of a comfort noise flag generator employed in the present invention.

The comfort noise flag generator 3 coprises, as shown in FIG. 4, a read-only memory (ROM) 3-1 and a reader 3-2. CN flag data are stored in the ROM 3-1. At the same when the switch 5 is switched to the (2) side, the reader 3-2 reads out the CN flag data for four bits of one sample from the ROM 3-1 to send out the CN flag data of 32 kbit/sec in a serial mode for a time period of 1 msec.

Figure 5:
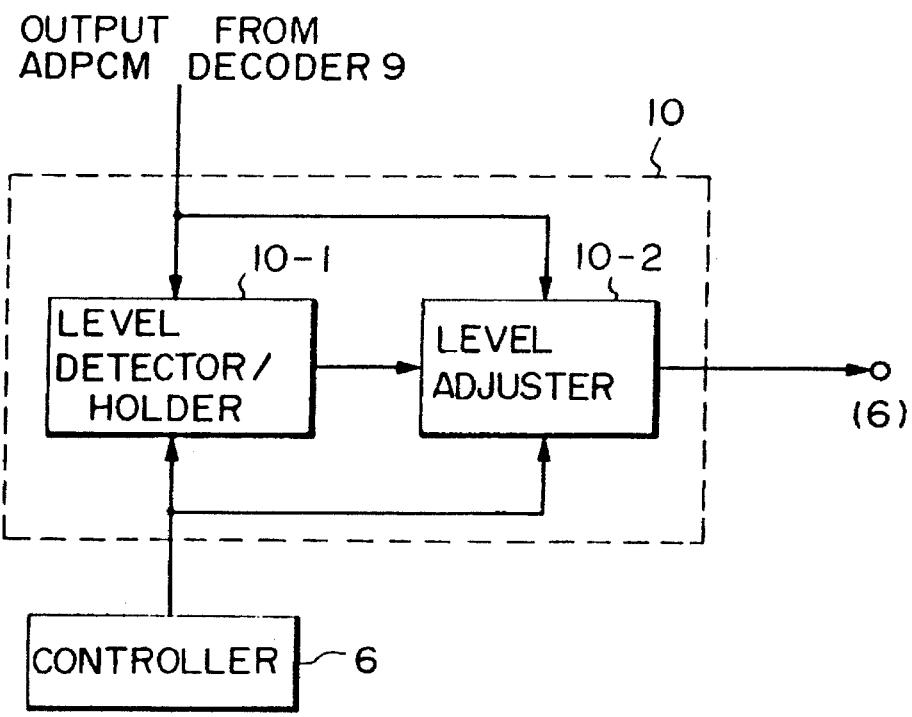
FIG. 5 is a block diagram illustrating an example of a comfort noise gain adjuster employed in the present invention.

Reference numeral 10 denotes a CN gain adjustor shown in FIG. 5, which, when the output of the ADPCM decoder 9 is a signal decoded from the output of the pseudo-noise generator 7, its level is corrected by a level adjuster 10-2 to be qual to that of the decoded signal of the immediately preceding CN data, which is detected and held in a level detector/holder 10-1, when a CN frag is detected by the controller 6.

Next, a description will be given of the control operation of the transmitting side.

The voice signal is present only when a voice is being uttered, whereas the background noise is present at all times.

Upon detecting that the voice signal is no longer present, the voice activity detector 2 applies a signal to the controller 4. The controller 4 immediately provides a switching signal to a switch 5 to switch the output of the ADPCM encoder 1 to the output of the CN flag generator 3 to indicate to the receiving side that the CN data will be sent next, not the voice signal. Then the CN flag is sent for a predetermined period of time, after which the switch 5 is changed over to the output of the ADPCM encoder 1, sending for a predetermined period of time the CN data, i.e. the background noise while no voice signal is present. After this, the discontinuous transmitter 12 stops transmission. The CN flag and the CN data are transmitted at predetermined time intervals.

Figure 2:
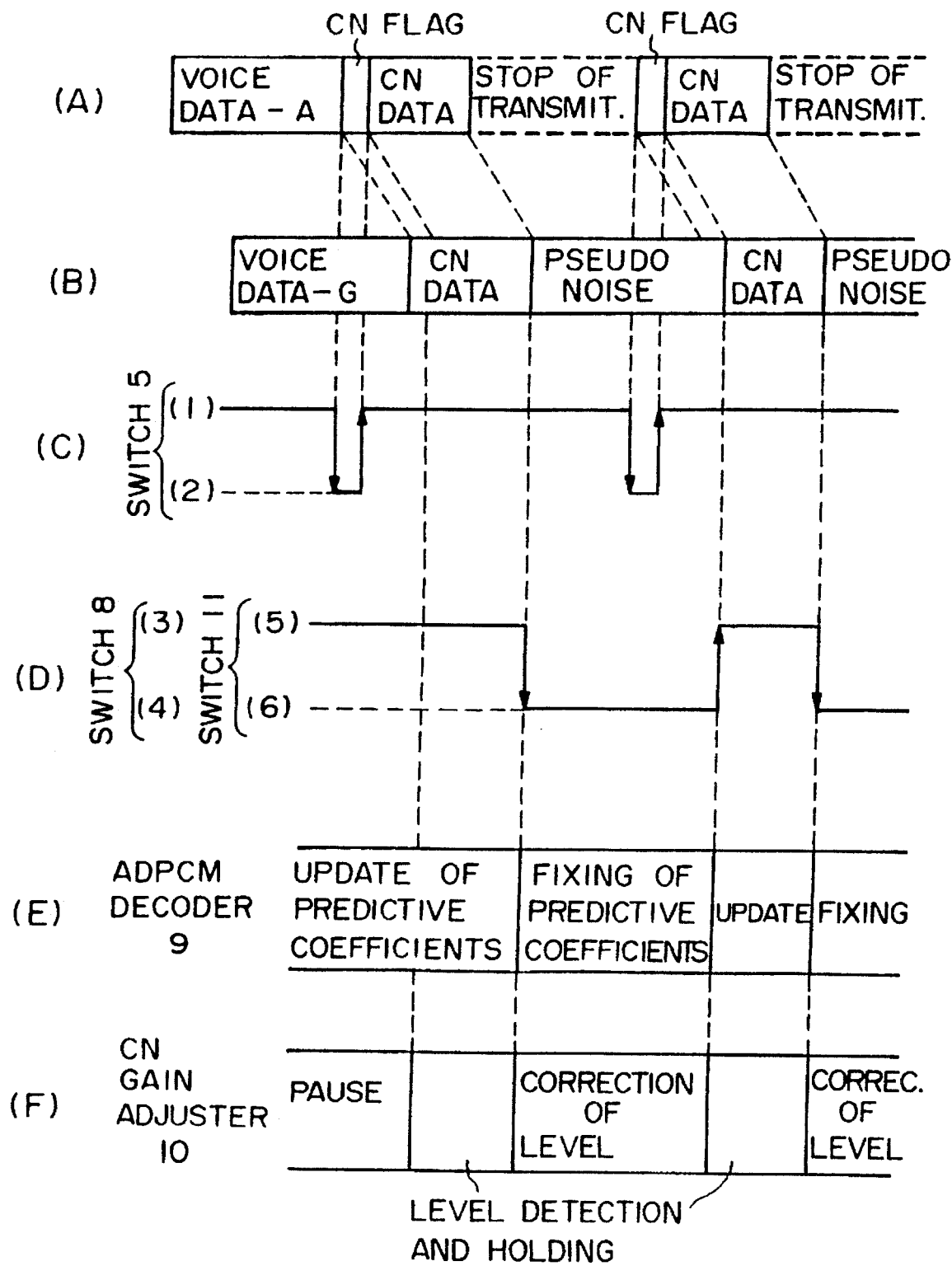
FIG. 2 is a timing chart for explaining the operation of the present invention.

FIG. 2 is a timing chart for explaining the above-mentioned operation. In FIG. 2, (A) shows the output signal of the encoding apparatus depicted in FIG. 1, (B) the input signal to the ADPCM decoder 9 of the receiving side and (C) the operation of the switch 5.

Upon detecting the end of voice data A in the coding apparatus of the transmitting side, the switch 5 is changed over to the CN flag generator side (2) and the CN flag is output in place of the voice data. At the end of the CN flag of a certain length, the switch 5 is changed over to the (1) side and the CN data is sent for a certain period of time, after which the transmission is stopped.

Since it is known that the background noise varies relatively gently with time, information about the background noise (i.e. the CN data) may be transmitted intermittently at suitable time intervals during the suspension of the voice signal, that is, while the transmission is being suspended, as shown in FIG. 2. When a voice signal is detected thereafter, the voice data A is sent again. When no voice signal is detected, the cycle of transmission of the CN flag and the CN data is repeated until a voice signal is detected or the transmission comes to an end.

In this way, transmission takes place only when the voice signal exists, and when the voice stops, the CN flag indicating the suspension of transmission and the background noise information (i.e. the CN data) are sent for a short period of time, after which the transmission is suspended. By this, the transmitting power can be reduced. According to the present invention, the power consumption can be reduced more than 50% of that of the associated circuits of the transmitting side in the case of no measures being taken for saving power consumption.

Next, processing at the receiving side will be described.

Since it is unknown at the receiving side which one of the voice data, the CN flag and the CN data the transmitted data is, the transmitted data is provided to the controller 6 to discern it.

The controller 6 always monitors the input data train so as to detect the CN flag. In its initial state the controller 6 receives the voice data as its input data. On this account, the switches 8 and 11 are connected to the input (3) and output (5) of the ADPCM decoder 9, respectively, and the data input to the decoder is processed as voice data.

When the silent duration begins, the CN flag is sent from the transmitting side. Upon detecting the CN flag, the controller 6 judges that the subsequent data is the CN data and that transmission is stopped after the end of the CN data. When no signal is received after the end of the CN data, the controller 6 switches the input to the ADPCM decoder 9 from the received data side (3) to the pseudo-noise generator 7 side (4) by the switch 8, providing the pseudo-noise from the pseudo-noise generator 7 to the ADPCM decoder 9 during the suspension of transmission.

The ADPCM decoder 9 has a function of holding and fixing predictive coefficients for the CN data (the actual background noise) so as to retain the spectral configuration of the pseudo-background noise. The decoder 9 decodes the output of the pseudo-noise generator 7, using the fixed predictive coefficients. At the end of the CN data, the controller 6 switches the output of the switch 11 from the output side (5) of the ADPCM decoder 9 to the output side (6) of the CN gain adjustor 10. FIG. 2(D) shows the operations of the switches 8 and 11 and (E) the operation of the ADPCM decoder 9.

In order that when the output data train from the ADPCM decoder 9 is not the received data train from the transmitting side but the output from the pseudo-noise generator 7, the level of the pseudo-noise may be made equal to the level of the actual background noise, the CN gain adjustor 10 holds the decoded signal level of the CN data and corrects the level of the decoded signal of the pseudo-noise to be equal to the level being held. FIG. 2(F) shows the operation of the CN gain adjustor 10.

A description will be given, with reference to the timing chart of FIG. 2, of the above-described operation on the time axis.

Voice data A transmitted from the transmitting side is decoded into voice data G but delayed by the duration of the CN flag. Since it is preknown that data received after the CN flag is preknown CN data, the received data is decoded intact and is output as the CN data. Since the transmission is suspended after the reception of the CN data, the controller 6 connects the switch 8 to the pseudo-noise generator 7 side (4). While the CN data is decoded and output, the CN gain adjustor 10 measures and holds the output level. Since it is preknown that only the background noise exists while the CN data is being sent, the detected value is the level of the background noise.

During the period before the next CN flag is detected, that is, during the suspension of transmission, the input to the ADPCM decoder 9 is the output data train from the pseudo-noise generator 7, and the output corrected to be equal to the detected and held level becomes the pseudo-background noise (CN). The above is the construction for the generation of the pseudo-background noise.

In FIG. 2(B), the receiving side handles the transmitted CN flag as the CN data and includes the CN flag in the CN data. The CN flag is 1 msec long, and even if it is input intact into the ADPCM decoder 9, it will not affect the reproduced voice output because of the background noise period. Since the switch 8 is not changed over to the received input side during the detection of the CN flag at the receiving side, the output from the pseudo-noise generator 7 is applied to the ADPCM decoder 9.

In the above description it is assumed that once the voice signal is interrupted, an appreciable amount of time (0.5 sec or more) would be consumed until it is detected next, as shown in FIG. 2. That is, the transmission suspending time in the above is assumed to be 0.5 sec and the duration of the CN data is assumed to be 20 msec. It is well-known in the automobile telephone that these values are appropriate.

In some cases, however, the voice signal may be detected again tens of milliseconds after no voice signal was detected. In the above no particular reference has been made to such a case. A description will be given of measures to be taken in such a case.

When a voice is detected immediately after the transmitting side sends the CN flag, it is impossible to decode a normal voice signal unless the transmission of the voice is noticed in some form to the receiving side, because the controller 6 is in the state of connecting the switch 8 to the pseudo-noise generator 7 side.

To prevent this, there is a method of setting two kinds of patterns of the CN flag. This is a method which sets a CN flag to be sent prior to the start of a voice and a CN flag to be sent after the end of the voice.

In another method, the CN flag is limited to one kind, but the CN flag which is sent within a predetermined period of time after the first CN flag is defined to be a flag signal indicating the start of a voice.

In this embodiment the CN flag subsequent to the voice signal is information indicating the end of a voice, but the CN flag which is received every 0.5 sec after the information is an update of the background noise information and the CN flag which is received within 0.5 sec after the voice end information is information indicating the start of a voice signal. The CN flag is 1 msec long, and even if information in this period is ADPCM decoded, it is the period of the background noise and will not affect the reproduced voice signal. It is also possible to replace the period of the CN flag with reproduced CN data by use of the aforementioned method in which the signal is sent after the time corresponding to the duration of the CN flag.

While in the above a brief description has been given of how to implement the circuits of the apparatus according to the present invention, the ADPCM encoder and the ADPCM decoder are usually formed by signal processing microprocessors, and accordingly, their associated circuits can easily be implemented as a part of a DSP program.

With the present invention, while the transmitting side stops transmission during the silent duration, the pseudo-noise generated at the receiving side can be made at about the same as the background noise in terms of the level and the characteristic of sound, and hence discomfort in hearing can be avoided.

The number of circuits and the amount of signal processing that are needed are each about ⅓ those needed in the past, and they do not matter in the fabrication of the apparatus.

What we claim is:

1. A voice decoding apparatus which receives, as the input thereto, an adaptive differential PCM coded voice signal and a comfort noise flag indicating a silent duration of a voice signal and an adaptive differential PCM coded background noise, the comfort noise flag and the background noise being transmitted from a transmitting side at a start of the silent duration, comprising:

a pseudo-noise generator for generating a pseudo-noise;

an adaptive differential PCM decoder which decodes the received input into a reproduced signal, and holds until the coded background noise of a subsequent silent duration is decoded, predictive coefficients obtained when the coded background noise of the silent duration is decoded and then decodes the subsequent pseudo-noise as comfort noise using the held predictive coefficients;

a first switch for selectively inputting the received input and the pseudo-noise into the adaptive differential PCM decoder;

a comfort noise gain adjuster receptive of the decoded signal from the adaptive differential PCM decoder and, when the decoded signal is the background noise, holds the level of the background noise and corrects the decoded signal level of the pseudo-noise to be equal to that of the background noise to obtain level-adjusted comfort noise;

a second switch for selectively outputting the output of the adaptive differential PCM decoder and the level-adjusted comfort noise output of the comfort noise gain adjuster as the reproduced signal output; and a controller which, when the comfort noise flag is detected from the received input and the background noise subsequent to the noise flag comes to an end, connects the first switch to the pseudo-noise generator side and the second switch to the comfort gain adjuster side, and when the comfort noise flag is detected next, connects the first switch to the received input side and the second switch to the adaptive differential PCM decoder side.

2. A voice decoding apparatus according to claim 1, in which said adaptive differential PCM decoder comprises:

an inverse adaptive quantizer receptive of the received input for inversely quantizing the received input to obtain a quantized differential signal, an adder for adding the quantized differential signal and a predictive signal to generate a reproduced signal, an adaptive predictor receptive of the quantize differential signal and the reproduced signal to generate the predictive signal using predictive coefficients, which are updated by the received signal; and a predictive coefficient holder receptive of the predictive coefficients and operatively connected to the controller for latching the predictive coefficients for a desired period of time to fixed values corresponding to a just preceding sample when the controller selects by the first switch the pseudo-noise generator.

* * * * *